United States Patent
Zheng (10) Patent No.: US 10,819,627 B2
(45) Date of Patent: Oct. 27, 2020

(54) NETWORK DEVICE STACKING

(71) Applicant: NEW H3C TECHNOLOGIES CO., LTD., Hangzhou (CN)

(72) Inventor: Wei Zheng, Beijing (CN)

(73) Assignee: NEW H3C TECHNOLOGIES CO., LTD., Hangzhou (CN)

( * ) Notice: Subject to any disclaimer, the term of this patent is extended or adjusted under 35 U.S.C. 154(b) by 0 days.

(21) Appl. No.: 16/309,855

(22) PCT Filed: May 8, 2017

(86) PCT No.: PCT/CN2017/083497
§ 371 (c)(1),
(2) Date: Dec. 13, 2018

(87) PCT Pub. No.: WO2017/219767
PCT Pub. Date: Dec. 28, 2017

(65) Prior Publication Data
US 2019/0334815 A1    Oct. 31, 2019

(30) Foreign Application Priority Data

Jun. 20, 2016 (CN) .......................... 2016 1 0457481

(51) Int. Cl.
*H04L 29/12* (2006.01)
*H04L 12/775* (2013.01)
(Continued)

(52) U.S. Cl.
CPC ........ *H04L 45/583* (2013.01); *H04L 41/0803* (2013.01); *H04L 41/12* (2013.01);
(Continued)

(58) Field of Classification Search
CPC .............................. H04L 45/02; H04L 45/583
See application file for complete search history.

(56) References Cited

U.S. PATENT DOCUMENTS

2006/0092832 A1    5/2006  Santoso et al.
2010/0257283 A1*  10/2010  Agarwal ................. H04L 63/08
                                                            709/250

(Continued)

FOREIGN PATENT DOCUMENTS

CN      1791064 A     6/2006
CN    101170483 A     4/2008
(Continued)

OTHER PUBLICATIONS

ISA State Intellectual Property Office of the People's Republic of China, International Search Report Issued in Application No. PCT/CN2017/083497, dated Jun. 30, 2017, WIPO, 4 pages.
(Continued)

*Primary Examiner* — Mansour Oveissi
(74) *Attorney, Agent, or Firm* — McCoy Russell LLP (57) ABSTRACT

A method and device for realizing automatic stacking of network devices are disclosed. According to an example of the method, when a network device determines its device role, the network device may send a first neighbor discovery message to a neighbor device and receive a second neighbor discovery message sent by the neighbor device. Next, if it determines that a topological structure between the network device and the neighbor device changes according to the second neighbor discovery message, the network device may determine whether a stacking condition to trigger stacking the network device and the neighbor device is satisfied or not. If the stacking condition is satisfied, the network device may further determine a stacking configuration for stacking the network device and the neighbor device. Then the network device may stack the network device with the neighbor device according to the stacking configuration.

13 Claims, 4 Drawing Sheets

(51) Int. Cl.
    *H04L 12/24*     (2006.01)
    *H04L 29/08*     (2006.01)

(52) U.S. Cl.
    CPC .......... *H04L 61/2015* (2013.01); *H04L 67/06* (2013.01); *H04L 61/6022* (2013.01); *H04L 69/324* (2013.01)

(56) References Cited

U.S. PATENT DOCUMENTS

| | | | |
|---|---|---|---|
| 2014/0156816 A1* | 6/2014 | Lopez Da Silva | H04L 41/042 709/221 |
| 2014/0185461 A1 | 7/2014 | Gautreau et al. | |
| 2015/0280993 A1 | 10/2015 | Gourlay et al. | |

FOREIGN PATENT DOCUMENTS

| | | |
|---|---|---|
| CN | 103746944 A | 4/2014 |
| CN | 104038448 A | 9/2014 |
| JP | 2006222929 A | 8/2006 |

OTHER PUBLICATIONS

State Intellectual Property Office of the People's Republic of China, Office Action and Search Report Issued in Application No. 201610457481.8, dated Sep. 4, 2019, 17 pages. (Submitted with Partial Translation).

"Troubleshooting Switch Stacks—Cisco," Cisco Website, Available Online at https://www.cisco.com/c/en/us/td/docs/switches/lan/catalyst3750/software/troubleshooting/switch_stacks.html, Sep. 16, 2008, 22 pages.

"Performing Switch Setup Configuration," Cisco Website, Available Online at https://www.cisco.com/c/en/us/td/docs/switches/lan/catalyst3650/software/release/37e/consolidated_guide/b_37e_consolidated_3650_cg/b_37e_consolidated_3650_cg_chapter_01010010.pdf, Mar. 12, 2015, 38 pages.

ISA State Intellectual Property Office of the People's Republic of China, Written Opinion of the International Searching Authority Issued in Application No. PCT/CN2017/083497, dated Jun. 30, 2017, WIPO, 4 pages.

European Patent Office, Extended European Search Report Issued in Application No. 17814505.8, dated Apr. 16, 2019, Germany, 12 pages.

Japanese Patent Office, Office Action Issued in Application No. 2018-566540, dated Dec. 3, 2019, 10 pages. (Submitted with Machine Translation).

European Patent Office, Office Action Issued in Application No. 17814505.8, dated Apr. 17, 2020, Netherlands, 5 pages.

State Intellectual Property Office of the People's Republic of China, Office Action and Search Report Issued in Application No. 201610457481.8, dated May 26, 2020, 8 pages. (Submitted with Machine Translation).

* cited by examiner

Fig. 5

NETWORK DEVICE STACKING

CROSS REFERENCE TO RELATED APPLICATIONS

The present application is a U.S. National Phase of International Patent Application Serial No PCT/CN2017/083497 entitled "NETWORK DEVICE STACKING," filed on May, 8, 2017. International Patent Application Serial No. PCT/CN2017/083497 claims priority to Chinese Patent Application No. 201610457481.8 filed on Jun. 20, 2016. The entire contents of each of the above-cited applications are hereby incorporated by reference in their entirety for all purposes.

BACKGROUND

A stacking technology may be used to prevent service interruption when a network device is out of order. For example, based on an Intelligent Resilient Framework (IRF), hardware resources and software processing capabilities of a plurality of network devices may be integrated to achieve cooperative work, unified management and uninterrupted maintenance for the plurality of network devices.

DETAILED DESCRIPTION OF THE EMBODIMENTS

Technical solutions in examples of the present disclosure will be described below clearly and completely in conjunction with the accompanying drawings in the examples of the present disclosure. It would be apparent that the described examples are merely part of the examples of the present disclosure but not all of them. All other examples obtained by those of ordinary skill in the art based on the examples in the present disclosure without creative work shall be encompassed in the scope of protection of the present disclosure.

Figure 1:
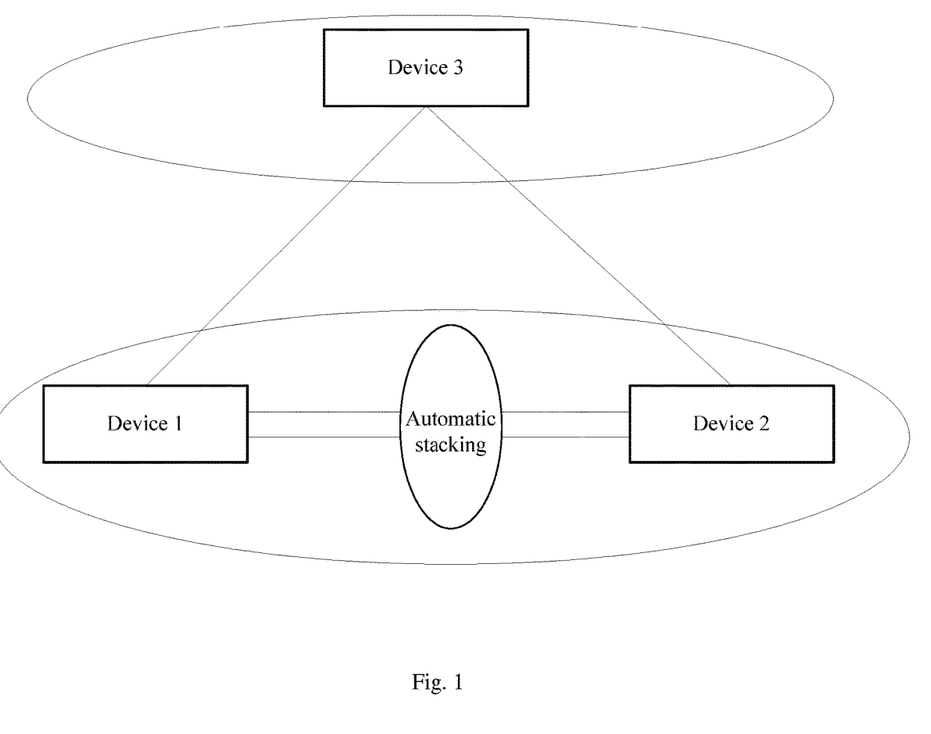
FIG. 1 illustrates a diagram of a network topology in the present disclosure.

When a stacking technology is used to stack network devices, a user can manually deploy a stacking configuration on different network devices. However, it is apparent that the user's workload will be greatly increased with easily occurring errors. For example, in a networking structure illustrated in FIG. 1, device 1 and device 2 serve as Leaf nodes, while device 3 serves as a Spine node. When stacking device 1 and device 2 by using stacking technology, a stacking configuration may be manually deployed on the two devices 1 and 2, which may increase user's workload. Moreover, errors may occur easily in manual deployment because of large volume of the stacking configuration.

In view of this, the present disclosure provides a method for stacking network devices to realize dynamic discovery and automatic stacking for any two network devices which play the same role but have different bridge MAC addresses.

Figure 2:
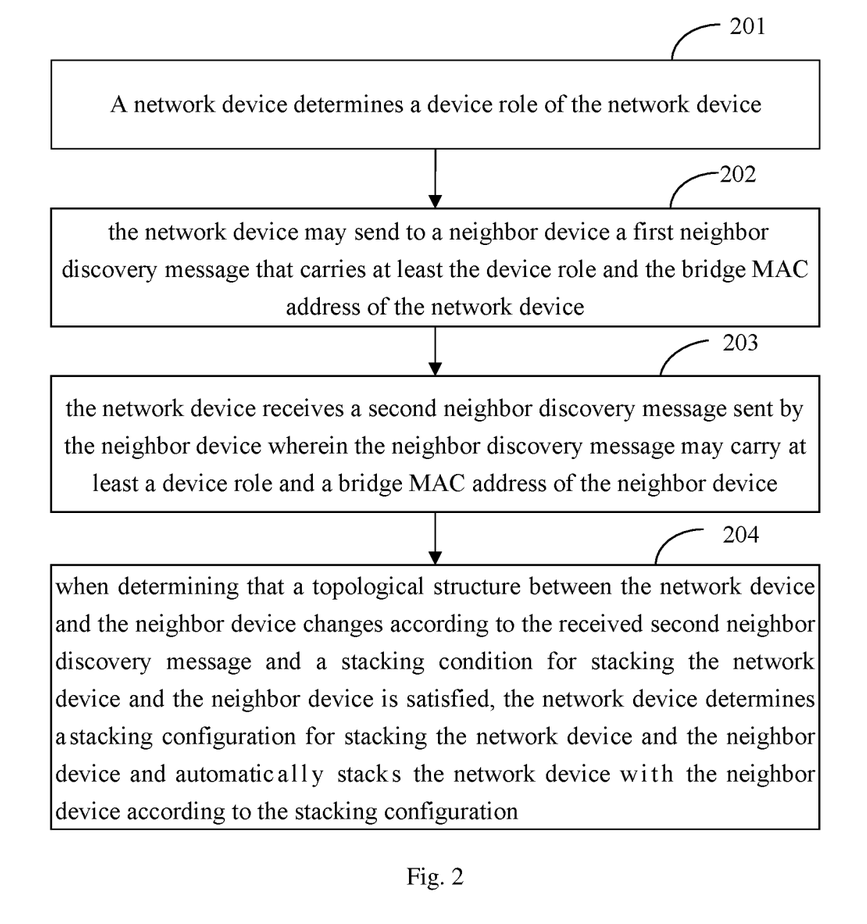
FIG. 2 schematically illustrates a flow diagram of a method for stacking network devices according to an example of the present disclosure.

FIG. 2 schematically illustrates a flow diagram of a method for stacking network devices according to an example of the present disclosure. As illustrated in FIG. 2, the method may include block 201 to block 203 as follows.

At block 201, a network device determines a device role of itself.

A device role of a network device may be set according to a configuration and functions of the network device. Where, the device role of the network device may be a device role that the network device plays in a network topology, for example, including Leaf node, Spine node, etc. To facilitate storage of the device role of the network device, a tag file corresponding to the network device may be preconfigured. Where, the tag file corresponding to the network device may contain at least information of the device role of the network device and an identifier of the network device. Here, the identifier of the network device may be a bridge Media Access Control (MAC) address of the network device, a serial number (SN) of the network device, or the like, which is not limited specifically in the present disclosure.

In an example of the present disclosure, a tag file corresponding to the network device may be stored in a Trivial File Transfer Protocol (TFTP) server which is independent to the network device, and the address of the TFTP server may be stored in a Dynamic Host Configuration Protocol (DHCP) server which is also independent to the network device, such that a storage mechanism of the network device is not necessary to be modified. Here, the TFTP server and the DHCP server may be configured on the same physical server, and may also be configured on different physical servers, which is not limited specifically in the present disclosure.

Based on this, the block 201 in which the network device determines its own device role may be achieved by the following processing a1 to a3.

In processing a1, the network device may obtain an address of a TFTP server from a DHCP server.

For example, when the network device is powered on and booted up to acquire an IP address from the DHCP server, the DHCP server may send the address of the TFTP server and the IP address allocated for the network device together to the network device.

In processing a2, the network device may download a tag file corresponding to the network device according to the address of the TFTP server.

For example, based on the obtained address of the TFTP server, the network device may send a download request to the TFTP server. Where, the download request may carry the identifier of the network device, such as the bridge MAC address or the serial number of the network device. When receiving the download request, the TFTP server may search local stored tag files for a tag file corresponding to the network device among by using the identifier of the network device carried in the download request as a searching keyword, and then send the found tag file to the network device.

In processing a3, the network device may parse the tag file, and determine a device role in the tag file as the device role of the network device when the parsing is successful, and determine a local default device role as its own device role when the parsing is failed.

For example, the network device itself may store a configuration file for saving the local default device role. Where, the local default device role may be customized according to a type of the network device. For example, the local default device role for a core switch may be customized as a Spine node, and the local default device role for an aggregation switch may be customized as a Leaf node.

Through processing a1 to a3, the determination for the device role of the network device may be realized.

At block 202, the network device may send to a neighbor device a first neighbor discovery message that carries at least the device role and the bridge MAC address of the network device.

As an example of the present disclosure, the neighbor discovery message may be a standard Link Layer Discovery Protocol (LLDP) packet or a predefined private protocol packet. No limitation is made to the specific form of the neighbor discovery message in the present disclosure. When the neighbor discovery message is the standard LLDP packet, a modification may be made to the format of the standard LLDP packet, for example, a private field for carrying the device role may be added to the LLDP packet.

At block 203, the network device receives a second neighbor discovery message sent by the neighbor device. Where, the neighbor discovery message may carry at least a device role and a bridge MAC address of the neighbor device.

At block 204, when determining that a topological structure between the network device and the neighbor device changes according to the received second neighbor discovery message and a stacking condition to trigger stacking the network device and the neighbor device is satisfied, the network device determines a stacking configuration for stacking the network device and the neighbor device and automatically stacks the network device with the neighbor device according to the stacking configuration.

Here, the stacking condition may be as follows: the device role of the network device is the same as that of the neighbor device carried in the received second neighbor discovery message, and the bridge MAC address of the network device is different from that of the neighbor device carried in the received second neighbor discovery message.

The second neighbor discovery message sent by the neighbor device may also carry an identifier of a physical port through which the neighbor device sends the second neighbor discovery message. When the network device receives the second neighbor discovery message, connection between a physical port through which the network device receives the second neighbor discovery message and a physical port corresponding to the physical port identifier carried in the second neighbor discovery message may be determined as a topological structure (hereinafter referred to as first topological structure) between the network device and the neighbor device. The network device may compare the first topological structure with a locally stored topological structure (hereinafter referred to as second topological structure) between the network device and the neighbor device. If the first topological structure is different from the second topological structure, it may indicates that the topological structure between the network device and the neighbor device changes.

It is to be noted that the network device may directly determine that the topological structure between the network device and the neighbor device changes if the locally stored second topological structure is not found after the network device determines the above first topological structure.

Two most important concepts: numbering value of the network device and stacking port, are proposed in stacking. Where, the numbering value of the network device refers to the numbering value of a network device in a stacking structure. For example, it may be required that each network device in the same stacking structure has a unique numbering value. Stacking port refers to a logical port on a network device for stacking with another network device, and the logical port may include at least one physical port (referred to as a member port of the stacking port). Thus, the configuration of a stacking port may mainly include a numbering value and member ports of the stacking port. Stacking network devices may be achieved when the numbering value of the network device and the configuration of the stacking port are determined.

Based on this, in block 204, determining the stacking configuration for stacking the network device and the neighbor device may be achieved by the following processing b1 to b2.

In processing b1, the network device may determine its own numbering value.

For example, the numbering value of the network device may be determined by comparing the bridge MAC address of the network device with the bridge MAC address of the neighbor device, which will be specifically described below and not redundantly described herein.

In processing b2, the network device may determine a numbering value of a stacking port on the network device for stacking with the neighbor device, and determine one or more member ports of the stacking port.

For example, determining the numbering value of a stacking port may be achieved according to the numbering value of the network device determined in processing b1, which will be specifically described below and not redundantly described herein.

In this example, as can be seen from processing b1 to processing b2, instead of manual deploying the stacking configuration, the network device may determine the numbering value of the network device according to the bridge MAC addresses of the network device and the neighbor device and further determine the numbering value of the stacking port on the network device and the member port(s) of the stacking port according to the numbering value of the network device. As the stacking configuration is determined dynamically by the network device, an autonomously dynamic stacking of network devices can be realized.

For stacking the network device and the neighbor device automatically according to the stacking configuration, any technical means for stacking network devices according to a stacking configuration, which is well known to a person skilled in the art, may be adopted, and which will be described briefly below.

The above are descriptions on the flow illustrated in FIG. 2.

In an example, block 202 and block 203 are both executed by activating a neighbor topology process on the premise that a neighbor discovery function of the network device is enabled, where the neighbor discovery function may be preconfigured in the network device and enabled by default. Alternatively, the neighbor discovery function may also be preconfigured in a template file saved by the TFTP server. In this case, the neighbor discovery function may be enabled by the network device executing one or more command lines in the template file obtained from the TFTP server.

The neighbor topology process may be preconfigured in a network device. Alternatively, the neighbor topology process may also be preconfigured in a template file saved by the TFTP server. In this case, the template file will be obtained from the TFTP server by the network device, and then one or more command lines in the template file may be executed to activate the neighbor topology process. When the neighbor topology process is activated, the network device may also determine whether the topological structure between the network device and the neighbor device changes or not according to the received second neighbor discovery message. For example, determining whether the topological structure between the network device and the neighbor device changes or not according to the received second neighbor discovery message in block 204 may be executed by the neighbor topology process which has been activated by the network device.

In addition, operations, such as determining whether the stacking condition to trigger stacking the network device and the neighbor device is satisfied or not, and determining the stacking configuration and automatically stacking the network device with the neighbor device according to the stacking configuration when the stack condition is satisfied, may be executed by activating a stacking management process. Where, the stacking management process may be preconfigured in the network device or in a template file saved by the TFTP server. The network device may activate the stacking management process by executing one or more command lines in the template file obtained from the TFTP server.

The flow illustrated in FIG. 2 will be described below with an application example by taking a LLDP packet as an example of the neighbor discovery message.

Figure 3:
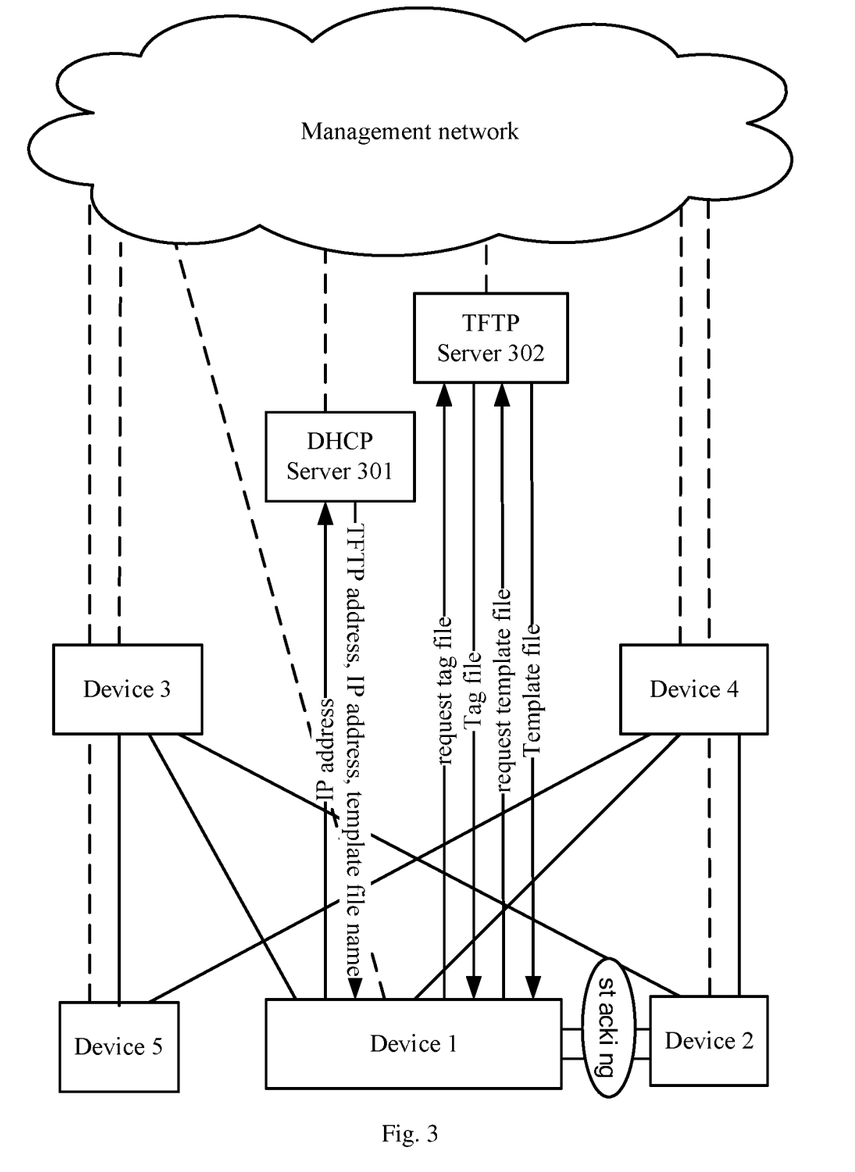
FIG. 3 schematically illustrates a network architecture to which a method for stacking network devices may be applied according to an example of the present disclosure.

Five network devices 1 to 5 are present in a networking structure as illustrated in FIG. 3, and the bridge MAC addresses of device 1 to device 5 are MAC1, MAC2, MAC3, MAC4 and MAC5 in order. Where, device 1, device 2 and device 5 are configured with a device role as "Leaf" by means of tag files, while device 3 and device 4 are configured with a device role as "Spine" by means of tag files. The tag file (hereinafter referred to as tag file 1) corresponding to device 1 includes an identifier (taking MAC1 for example) of device 1, and device 1 is configured to play the device role as "Leaf". The tag file (hereinafter referred to as tag file 2) corresponding to device 2 includes an identifier (taking MAC2 for example) of device 2, and device 2 is configured to play the device role as "Leaf". The tag file (hereinafter referred to as tag file 3) corresponding to device 3 includes an identifier (taking MAC3 for example) of device 3, and device 3 is configured to play the device role as "Spine". The tag file (hereinafter referred to as tag file 4) corresponding to device 4 includes an identifier (taking MAC4 for example) of device 4, and device 4 is configured to play the device role as "Spine". The tag file (hereinafter referred to as tag file 5) corresponding to device 5 includes an identifier (taking MAC5 for example) of device 5, and device 5 is configured to play the device role as "Leaf". Tag file 1 to tag file 5 may be all stored in a TFTP server.

In FIG. 3, a DHCP server 301, the TFTP server 302, and device 1 to device 5 are all connected to a management network, and device 1, device 2 and device 5 are also connected to device 3 and device 4.

The following are descriptions about how to automatically stack device 1 with device 2 based on the flow illustrated in FIG. 2. Certainly, the automatically stacking device 3 with device 4 may follow a similar principle.

Device 1 is powered on and booted up to send a message for requesting an IP address to the DHCP server 301.

When receiving the message for requesting an IP address sent by device 1, the DHCP server 301 allocates an IP address for device 1 and sends the allocated IP address together with an address of the TFTP server 302 and a predefined first template file name to device 1.

Device 1 may save the IP address when receiving the IP address, the address of the TFTP server 302 and the first template file name sent by the DHCP server 301, and may use the IP address for communication. For example, based on the received address of the TFTP server 302, device 1 may send a download request to the TFTP server 302. Where, the download request may carry an identifier of device 1, e.g., bridge MAC address MAC1.

When receiving the download request sent by device 1, the TFTP server 302 may use the bridge MAC address MAC1 of device 1 as a keyword to search local stored tag files for a tag file containing the keyword, namely the above tag file 1. The TFTP server 302 then returns the tag file 1 to device 1.

Device 1 may receive and parse tag file 1. When the parsing is successful, device 1 may determine the device role "Leaf" in tag file 1 as the device role of device 1. However, when the parsing is failed, device 1 may determine a local default device role in a local configuration file as the device role of device 1. Successful parsing is taken for example here; thus, device 1 will determine the device role of device 1 as "Leaf".

Next, device 1 may add the device role of device 1 to the received first template file name to form a second template file name associated with device 1. According to an example, the adding may refer to connecting the received first template file name and the device role of device 1 by using an underline.

Device 1 may download from the TFTP server 302 a template file according to the second template file name associated with device 1, parse the downloaded template file and execute one or more command lines in the template file. In this way, an LLDP function may be enabled, and a neighbor topology process, a stacking management process, and etc. may be activated. On initialization, a template file corresponding to the second template file name associated with each device may be pre-stored in the TFTP server 302.

Device 1 may regularly send LLDP packet to device 2 serving as the neighbor device of device 1 based on the activated neighbor topology process when the LLDP function is enabled.

If device 2 also enables the LLDP function and activates the neighbor topology process according to a flow similar to that of device 1, device 2 may also regularly send an LLDP packet to device 1. Based on this, device 1 may also receive LLDP packets sent by device 2.

When device 1 receives an LLDP packet (hereinafter referred to as packet 1) sent by device 2, a physical port through which device 1 receives packet 1 is hereinafter referred to as port 1_1, and device 1 may parse the received packet 1 to obtain an identifier of a physical port (hereinafter referred to port 2_2) through which device 2 sends the packet 1. Then, device 1 may determine connection from port 1_1 on device 1 to port 2_2 on device 2 as a topological structure (which may be hereinafter referred to as topological structure 01_02) between device 1 and device 2.

Assuming that a topological structure (hereinafter referred to as topological structure 01_01) between device 1 and device 2 is locally stored in device 1. Where, the topological structure 01_01 indicates the connection from port 1_1 of device 1 to port 1_1 of device 2.

Device 1 may compare topological structure 01_02 with topological structure 01_01. If the comparison result shows the two topological structures are different, it may be determined that the topological structure between device 1 and device 2 changes.

Device 1 may store the topological structure 01_02 to replace the topological structure 01_01. It is to be noted that device 1 may directly determine that the topological structure between device 1 and device 2 changes if there is no topological structure between device 1 and device 2 locally stored in device 1, and may directly store the topological structure 01_02.

Device 1 determines whether a stacking condition to trigger stacking device 1 and device 2 is satisfied or not based on the activated stacking management process. Where, the stacking condition may include: the device role of device 1 is the same as the device role of device 2, and the bridge MAC address of device 1 is different from the bridge MAC address of device 2.

When device 1 determines that the above stacking condition is satisfied, a stacking configuration timer is initiated. Time duration of the stacking configuration timer may be set according to an actual application situation, for example, 45 seconds.

Device 1 may send an LLDP packet to device 2 to cause device 2 to determine in time whether the topological structure between device 2 and device 1 changes or not. Then device 2 may similarly determine whether the topological structure between device 2 and device 1 changes or not according to the above, which is not described repeatedly herein.

Device 1 may compare the bridge MAC address (MAC1) of device 1 with the bridge MAC address (MAC2) of device 2, and determine a numbering value of device 1 according to the comparison result. For example, device 1 may be assigned with a first numbering value when MAC1 is smaller than MAC2. Device 1 may be assigned with a second numbering value when MAC1 is larger than MAC2. In an example, numbering values of network devices may include a first numbering value and a second numbering value. Where, the first numbering value of network device may be 1 and the second numbering value of network device may be 2.

Device 1 may determine a numbering value of a stacking port on itself for stacking with device 2 according to the numbering value of device 1 and a preset correspondence between numbering values of network device and stacking port. In an example, numbering values of stacking port may include a first numbering value and a second numbering value. Where, the first numbering value may be assigned to a stacking port which is a left port and the second numbering value may be assigned to a stacking port which is a right port. When the correspondence between numbering values of network device and stacking port is preset, a network device with the first numbering value may correspond to a stacking port with the first numbering value and a network device with the second numbering value may correspond to a stacking port with the second numbering value. Based on this, when device 1 is assigned with the first numbering value, the stacking port on device 1 for stacking with device 2 may be the stacking port with the first numbering value. When device 1 is assigned with the second numbering value, the stacking port on device 1 for stacking with device 2 may be the stacking port with the second numbering value.

Next, device 1 may determine member port(s) of the stacking port on device 1 for stacking with device 2. Specifically, device 1 may first add port 1_1 through which device 1 receives packet 1 to a member port list of the stacking port. Here, when the activated stacking configuration timer does not expires, if device 1 receives another LLDP packet (hereinafter referred to as packet 2) also carrying the bridge MAC of device 2 MAC2 sent by device 2, device 1 may determine whether a physical port (hereinafter referred to as port 1_2) through which device 1 receives packet 2 is already recorded in the above member port list or not. If not, port 1_2 may be added to the above member port list.

The numbering value of device 1, the numbering value of the stacking port on device 1 for stacking with device 2, and the member port(s) of the stacking port may be integrally referred to as a stacking configuration for stacking device 1 and device 2.

When the above activated stack configuration timer expires, device 1 may generate one or more stacking configuration command lines from the above stacking configuration and locally run the stacking configuration command line(s) to put the stacking configuration into effect. Further, device 1 may save the stacking configuration.

Device 1 may then compare whether the numbering value of itself in the above stacking configuration is consistent with an existing numbering value of device 1. If the two numbering values are inconsistent, device 1 may be rebooted. If the two numbering values are consistent, one device to be rebooted may be selected from device 1 and device 2. For example, when device 1 is selected as the device to be rebooted, device 1 is rebooted. Alternatively, when device 2 is selected as the device to be rebooted, device 2 is rebooted. Here, selecting the device to be rebooted from device 1 and device 2 may be achieved via a combination function of a stacking technology which is well known to a person skilled in the art, which is not redundantly described herein.

It is to be noted that the above existing numbering value of device 1 may represent a historical numbering value of device 1, including but not limited to: an initial numbering value of device 1 set when delivered out of factory; and a numbering value of device 1 which is configured for stacking with any other network devices but not deleted when the stacking is cancelled.

Device 1 interacts with device 2 based on the above effective stacking configuration so as to stack device 1 and a neighbor device. For example, device 1 may send to device 2 the numbering value of itself and member port(s) of the stacking port which are included in the above stacking configuration by a stacking interaction message. Accordingly, device 2 may check whether the received numbering value of device 1 and member port(s) of the stacking port satisfy the following stacking requirements or not: the numbering value of device 2 is not the same as the received numbering value of device 1; the stacking port with the first numbering value is connected to the stacking port with the second numbering value, and the stacking port with the second numbering value is connected to the stacking port with the first numbering value. When the above requirements are satisfied, device 2 sends a stacking message to device 1. At this point, stacking of device 1 and device 2 is realized.

It is to be noted that in order to prevent device 1 (similar to other network devices) from repeatedly joining in the stack, device 1 may further execute the following block: checking whether device 1 is in a stacking mode or not, before executing the determination on whether the stacking condition to trigger stacking device 1 and device 2 is satisfied or not.

Device 1 being in the stacking mode includes at least that: device 1 is already stacked with a neighbor device, for example, device 2 or another neighbor device such as device 5, and the neighbor device stacked with device 1 is in working state.

If device 1 is not in the stacking mode, device 1 will continue to execute the determination on whether the stacking condition to trigger stacking device 1 and device 2 is satisfied or not.

If device 1 is in the stacking mode, even though the topological structure between device 1 and device 2 changes, device 1 may neglect the changes and end the current flow. Thus, device 1 will not execute the above determination on whether the stacking condition to trigger stacking device 1 and device 2 is satisfied or not.

For example, if device 1 is already stacked with device 5 and device 5 is now in working state, even though device 1 determines that the topological structure between device 1 and device 2 changes, device 1 will neglect the changes of the topological structure between device 1 and device 2 and end the current flow without determining whether the stacking condition for stacking device 1 and device 2 is satisfied or not.

For another example, if device 1 is already stacked with device 2 and device 2 is in working state until now, even though device 1 subsequently determines that the topological structure between device 1 and device 2 changes, device 1 will neglect the changes of the topological structure between device 1 and device 2 and end the current flow without determining whether the stacking condition for stacking device 1 and device 2 is satisfied or not. With the two examples, it can be seen that one device will not be stacked repeatedly if the device is already in the stacking mode, thus avoiding resource waste caused by repeatedly stackings.

Corresponding to the above method, the present disclosure also provides a device for automatically stacking network devices. The device may be applicable to a network device.

Figure 4:
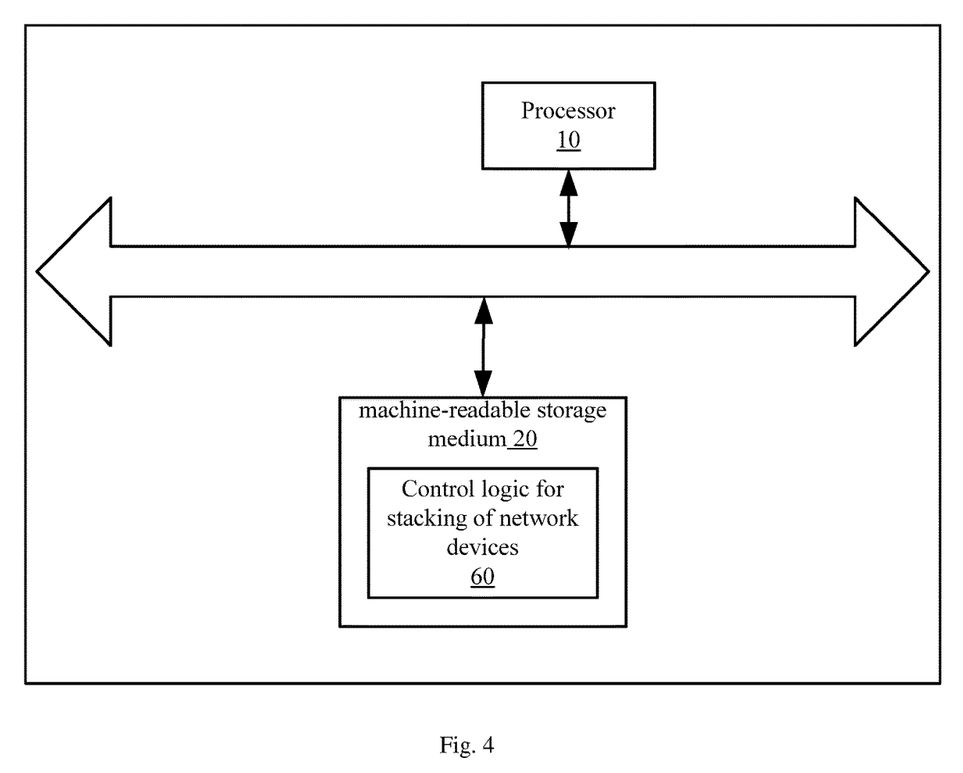
FIG. 4 schematically illustrates a hardware structure of a device for stacking network devices according to an example of the present disclosure.

The device provided by the present disclosure may be implemented by software, hardware or a combination of software and hardware. By taking implementation by software for example, machine-executable instructions corresponding to a control logic 60 for stacking network devices in a machine-readable storage medium 20 may be read and executed by the processor 10. From the view of hardware, as shown in FIG. 4, a hardware structure of the device is illustrated according an example of the disclosure. Apart from the processor 10, the machine-readable storage medium 20 illustrated in FIG. 4, other hardware such as an interface for communication with external device may also be included in the device according to actual functions of the network device, which is not redundantly described herein.

In different examples, the machine-readable storage medium 20 may be any electronic, magnetic optical, or other physical storage apparatus to contain or store information such as executable instructions, data, and the like. For example, the machine-readable storage medium 20 described herein may be any of Random Access Memory (RAM), a volatile memory, a nonvolatile memory, a flash memory, a memory drive (for example, a hard disk drive), a solid state hard drive, any type of storage disk (for example, optical disk, DVD, etc.), or a similar storage medium, or a combination thereof.

Further, the machine-readable storage medium 20 may store thereon machine-executable instructions corresponding to the control logic 60 for stacking network devices that are executed by the processor 10.

Figure 5:
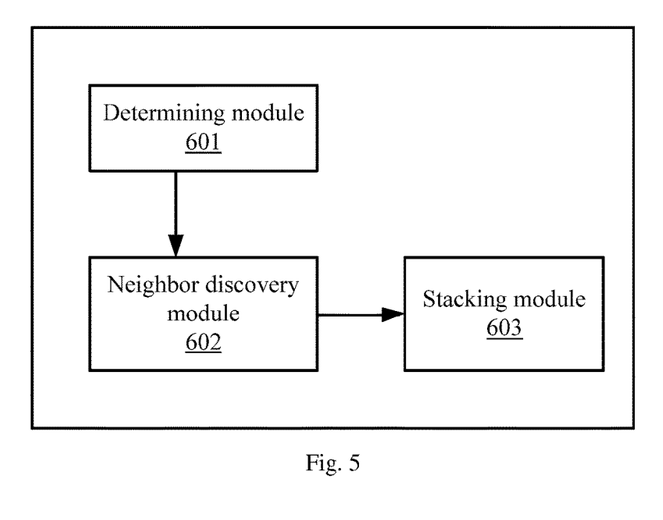
FIG. 5 illustrates a block diagram of functional modules of a control logic for stacking network devices according to an example of the present disclosure.

Referring to FIG. 5, functionally, the control logic 60 for stacking network devices may include a determining module 601, a neighbor discovery module 602 and a stacking module 603.

Specifically, the determining module 601 may be configured to determine a device role of the network device.

The neighbor discovery module 602 may be configured to send a first neighbor discovery message to a neighbor device, where the first neighbor discovery message carries at least the device role and a bridge MAC address of the network device. The neighbor discovery module 602 may also receive a second neighbor discovery message sent by the neighbor device which carries at least a device role and a bridge MAC address of the neighbor device. Thus, the neighbor discovery module 602 may determine whether a topological structure between the network device and the neighbor device changes or not according to the received second neighbor discovery message.

The stacking module 603 may be configured to determine whether a stacking condition to trigger stacking the network device and the neighbor device is satisfied or not when the neighbor discovery module 602 determines that the topological structure between the network device and the neighbor device changed. Also, the stacking module 603 determines a stacking configuration for stacking the network device and the neighbor device when it is determined that the stacking condition is satisfied, and stacks the network device and the neighbor device together according to the stacking configuration. The stacking condition may include that: the device role of the network device is the same as the device role of the neighbor device, and the bridge MAC address of the network device is different from the bridge MAC address of the neighbor device.

According to an example, the determining module 601 may be specifically configured to: obtain an address of a TFTP server from a DHCP server, and download a tag file corresponding to the network device from the TFTP server according to the obtained address. When the tag file is downloaded, the determining module 601 may parse the tag file. Moreover, the determining module 601 may determine a device role in the tag file as the device role of the network device when the parsing is successful and may determine a local default device role for the network device as the device role of the network device when the parsing is failed.

According to an example, when determining the stacking configuration for stacking the network device and the neighbor device, the stack module 603 may specifically configured to: determine a numbering value of the network device, determine a numbering value of a stacking port on the network device for stacking with the neighbor device, and determine one or more member ports of the stacking port.

Specifically, the stacking module 603 may determine the numbering value of the network device according to the bridge MAC address of the network device and the bridge MAC address of the neighbor device. For example, the stacking module 603 may be specifically configured to: compare the bridge MAC address of the network device with the bridge MAC address of the neighbor device; assign a first numbering value to the network device when the bridge MAC address of the network device is smaller than the bridge MAC address of the neighbor device; and assign a second numbering value to the network device when the bridge MAC address of the network device is larger than the bridge MAC address of the neighbor device.

Specifically, the stacking module 603 may determine the numbering value of the stacking port on the network device according to a preset correspondence between numbering values of network device and stacking port. For example, the stacking module 603 may be specifically configured to: assign a first numbering value to the stacking port according to the correspondence between numbering values of network device and stacking port when the network device is assigned with the first numbering value, and assign a second numbering value to the stacking port when the network device is assigned with the second numbering value.

According to an example, when determining the stacking configuration for stacking the network device and the neighbor device, the stacking module 603 may further initiate a stacking configuration timer upon determining that the stacking condition is satisfied. Thus, when determining the one or more member ports of the stacking port, the stacking module 603 may be specifically configured to: add a physical port through which the network device receives the second neighbor discovery message, to a member port list of the stacking port; add a physical port through which the network device receives a third neighbor discovery message sent by the neighbor device to the member port list if the third neighbor discovery message is received when the stacking configuration timer does not expires and the physical port through which the network device receives the third neighbor discovery message is not in the member port list. Furthermore, the stacking module 603 will automatically stack the network device with the neighbor device according to the stacking configuration upon the expiry of the stack configuration timer.

According to an example, when stacking the network device with the neighbor device according to the stacking configuration, the stacking module 603 may be specifically configured to: generate one or more stacking configuration command lines from the stacking configuration, locally run the one or more stacking configuration command lines to enable the stacking configuration and save the stacking configuration; determine whether the numbering value of the network device in the stacking configuration is consistent with an existing numbering value of the network device, if not, reboot the network device, and if yes, select one of the network device and the neighbor device to reboot. For example, when the network device is selected to be rebooted, the stacking module 603 reboots the network device. However, when the neighbor device is selected to be rebooted, the stacking module 603 informs the neighbor device of reboot. Then, the stacking module 603 stacks the network device and the neighbor device by interacting with the neighbor device based on the enabled stacking configuration.

According to an example, the stacking module 603 may also be specifically configured to check whether the network device is already in a stacking mode before determining whether the stacking condition to trigger stacking the network device and the neighbor device is satisfied or not. If a result of the above determination is not, the stacking module 603 continues to execute the operation of determining whether the stacking condition for stacking the network device and the neighbor device is satisfied or not. Specifically, the network device being in the stacking mode includes at least that: the network device is already stacked with the neighbor device or another neighbor device and the neighbor device stacked with the network device is in working state.

According to an example, the determining module 601 may also be configured to obtain a predefined first template file name from the DHCP server, and add the device role of the network device to the first template file name to form a second template file name associated with the network device. Then, the determining module 601 may download a template file associated with the network device from the TFTP server according to the second template file name, parse the downloaded template file associated with the network device, and execute one or more command lines in the template file associated with the network device to enable a neighbor discovery function, activate a neighbor topology process and activate a stacking management process.

Specifically, the neighbor topology process may be activated to allow the neighbor discovery module 602 to send a first neighbor discovery message to a neighbor device, receive a second neighbor discovery message sent by the neighbor device and determine whether the topological structure between the network device and the neighbor device changes or not when an LLDP function is enabled. The stacking management process may be activated to allow the stacking module 603 to determine whether the stacking condition to trigger stacking the network device and a neighbor device is satisfied, and collect the stacking configuration when the stacking condition is satisfied and automatically stack the network device with the neighbor device together according to the stacking configuration.

The following are further descriptions on how a network device executes the control logic 60 for stacking network devices by taking implementation by software for example. In this example, the control logic 60 of the present disclosure should be interpreted as machine-executable instructions stored in the machine-readable storage medium 20. When the processor 10 of the network device of the present disclosure invokes and executes the machine-executable instructions corresponding to the control logic 60, the processor 10 may be caused to execute the following operations:

determine a device role of the network device;

send a first neighbor discovery message to a neighbor device, wherein the first neighbor discovery message may carry at least the device role and a bridge MAC address of the network device;

receive a second neighbor discovery message sent by the neighbor device, wherein the second neighbor discovery message may carry at least a device role and a bridge MAC address of the neighbor device;

determine whether a topological structure between the network device and the neighbor device changes or not according to the second neighbor discovery message;

determine whether a stacking condition to trigger stacking the network device and the neighbor device is satisfied or not when it is determined that the topological structure changed;

determine a stacking configuration for stacking the network device and the neighbor device when it is determined that the stacking condition is satisfied, and stack the network device and the neighbor device according to the stacking configuration.

Specifically, the stacking condition may include that: the device role of the network device is the same as the device role of the neighbor device, and the bridge MAC address of the network device is different from the bridge MAC address of the neighbor device.

According to an example, the stacking condition may further include that: the network device is not in a stacking mode.

According to an example, when determining the device role of the network device, the machine-executable instructions may cause the processor 10 to: obtain an address of a TFTP server from a DHCP server; download a tag file corresponding to the network device from the TFTP server according to the obtained address; parse the tag file; determine a device role in the tag file as the device role of the network device when the parsing is successful; and determine a local default device role for the network device as the device role of the network device when the parsing is failed.

According to an example, when determining the stacking configuration for stacking the network device and the neighbor device, the machine-executable instructions may cause the processor 10 to: determine a numbering value of the network device according to the bridge MAC address of the network device and the bridge MAC address of the neighbor device; determine a numbering value of a stacking port on the network device according to the numbering value of the network device and a correspondence between numbering values of network device and stacking port, wherein the stacking port is to be used for stacking the network device and the neighbor device; and determine one or more member ports of the stacking port.

Specifically, when determining the numbering value of the network device according to the bridge MAC addresses of the network device and the neighbor device, the machine-executable instructions may cause the processor 10 to: assign a first numbering value to the network device when the bridge MAC address of the network device is smaller than the bridge MAC address of the neighbor device; and assign a second numbering value to the network device when the bridge MAC address of the network device is larger than the bridge MAC address of the neighbor device.

When determining the numbering value of the stacking port on the network device is according to the numbering value of the network device and the correspondence between numbering values of network device and stacking port, the machine-executable instructions may cause the processor 10 to: assign a first numbering value to the stacking port when the network device is assigned with a first numbering value; and assign a second numbering value to the stacking port when the network device is assigned with a second numbering value.

For determining the one or more member ports of the stacking port, the machine-executable instructions may cause the processor 10 to: add a physical port through which the network device receives the second neighbor discovery message to a member port list of the stacking port; and add a physical port through which the network device receives a third neighbor discovery message sent by the neighbor device to the member port list when the third neighbor discovery message is received in a preset waiting time period and the physical port through which the network device receives the third neighbor discovery message is not in the member port list, where the waiting time period is passed from when the network device determines the stacking condition is satisfied until when stacking the network device and the neighbor device is started according to the stacking configuration.

According to an example, when stacking the network device and the neighbor device according to the stacking configuration, the machine-executable instructions may cause the processor 10 to: generate one or more stacking configuration command lines from the stacking configuration; enable the stacking configuration by running the one or more stacking configuration command lines locally; reboot the network device when the numbering value of the network device in the stacking configuration is inconsistent with an existing numbering value of the network device; reboot the network device or inform the neighbor device of the reboot when the numbering value of the network device in the stacking configuration is consistent with the existing numbering value of the network device; stack the network device and the neighbor device by interacting with the neighbor device based on the enabled stacking configuration.

According to an example, the machine-executable instructions may also cause the processor to: obtain a predefined first template file name from a DHCP server; form a second template file name by adding the device role of the network device to the first template file name; download a template file from a TFTP server according to the second template file name; and execute one or more command lines in the template file to enable a neighbor discovery function, activate a neighbor topology process for sending the first neighbor discovery message, receiving the second neighbor discovery message and determining whether the topological structure between the network device and the neighbor device changes or not when the neighbor discovery function is enabled, and activate a stacking management process for determining whether the stacking condition is satisfied or not, determining the stacking configuration and stacking the network device and the neighbor device according to the stacking configuration.

For the device examples, since they basically correspond to the method examples, the correlations there between are just referred to part of the descriptions of the method examples. The device examples described above are merely schematic, wherein units described as separate members may be or may not be physically separated, and members displayed as units may be or may not be physical units, i.e. they may be located in one place, or may be distributed to a plurality of network units. Part or all of the modules may be selected according to actual requirements to achieve the objectives of the schemes in the examples. Those of ordinary skill in the art can understand and implement the schemes without creative work.

It is to be noted that relational terms such as first, second and the like in this text are merely used for distinguishing one entity or operation from another entity or operation rather than definitely requiring or implying any actual relationship or order between these entities or operations. In addition, the terms "comprising" and "including", or any other variants thereof are intended to contain non-exclusive comprising, such that a process, a method, an article or a device comprising a series of elements includes not only those elements, but also other elements not explicitly listed, or further includes inherent elements of the process, the method, the article or the device. Without more limitations, elements defined by the sentence of "comprising a . . . " shall not be exclusive of additional same elements also existing in the process, the method, the article or the device.

The above are detailed descriptions of the method and device provided by the examples of the present disclosure. Specific examples are used herein to set forth the principles and implementations of the present disclosure, and the descriptions of the above examples are merely used for helping understand the method of the present disclosure and the core idea thereof. Moreover, for those of ordinary skill in the art, variations may be made to specific examples and the range of disclosure according to the idea of the present disclosure. In conclusion, the contents of the present disclosure should not be interpreted as limitations to the present disclosure.

The invention claimed is:
1. A method of stacking network devices, comprising:
determining, by a network device, a device role of the network device;

sending, by the network device, a first neighbor discovery message to a neighbor device, wherein the first neighbor discovery message carries at least the device role and a bridge Media Access Control (MAC) address of the network device;

receiving, by the network device, a second neighbor discovery message sent by the neighbor device which carries at least a device role and a bridge MAC address of the neighbor device;

determining, by the network device, whether a topological structure between the network device and the neighbor device changes or not according to the second neighbor discovery message;

determining, by the network device, whether a stacking condition to trigger stacking the network device and the neighbor device is satisfied or not when it is determined that the topological structure changed;

determining, by the network device, a stacking configuration for stacking the network device and the neighbor device when it is determined that the stacking condition is satisfied; and stacking, by the network device, the network device and the neighbor device according to the stacking configuration, wherein the stacking condition comprises that:
the device role of the network device is the same as the device role of the neighbor device; and
the bridge MAC address of the network device is different from the bridge MAC address of the neighbor device.

2. The method according to claim 1, wherein the stacking condition further comprises that:
the network device is not in a stacking mode presently.

3. The method according to claim 1, wherein determining the device role of the network device comprises:
obtaining, by the network device, an address of a Trivial File Transfer Protocol (TFTP) server from a Dynamic Host Configuration Protocol (DHCP) server;
downloading, by the network device, a tag file corresponding to the network device from the obtained TFTP server address;
parsing, by the network device, the tag file;
determining, by the network device, a device role in the tag file as the device role of the network device when the parsing is successful; and determining, by the network device, a local default device role as the device role of the network device when the parsing is failed.

4. The method according to claim 1, wherein determining the stacking configuration for stacking the network device and the neighbor device comprises:
determining, by the network device, a numbering value of the network device according to the bridge MAC address of the network device and the bridge MAC address of the neighbor device;
determining, by the network device, a numbering value of a stacking port on the network device to be used for stacking the network device and the neighbor device, according to the numbering value of the network device and a correspondence between numbering values of network device and stacking port; and determining, by the network device, one or more member ports of the stacking port.

5. The method according to claim 4, wherein determining the numbering value of the network device according to the bridge MAC address of the network device and the bridge MAC address of the neighbor device comprises:
assigning, by the network device, a first numbering value to the network device when the bridge MAC address of the network device is smaller than the bridge MAC address of the neighbor device; and assigning, by the network device, a second numbering value to the network device when the bridge MAC address of the network device is larger than the bridge MAC address of the neighbor device.

6. The method according to claim 4, wherein determining the one or more member ports of the stacking port comprises:
adding, by the network device, a physical port through which the network device receives the second neighbor discovery message, to a member port list of the stacking port; and adding, by the network device, a physical port through which the network device receives a third neighbor discovery message sent by the neighbor device to the member port list when the third neighbor discovery message is received in a preset waiting time period and the physical port through which the network device receives the third neighbor discovery message is not in the member port list, wherein the waiting time period is a specific time length from when the network device determines the stacking condition is satisfied until when stacking the network device and the neighbor device is started according to the stacking configuration.

7. The method according to claim 4, wherein determining the numbering value of the stacking port on the network device to be used for stacking the network device and the neighbor device, according to the numbering value of the network device and the correspondence between numbering values of network device and stacking port comprises:
assigning, by the network device, a first numbering value to the stacking port when the network device is assigned with the first numbering value; and assigning, by the network device, a second numbering value to the stacking port when the network device is assigned with the second numbering value.

8. The method according to claim 1, wherein stacking the network device and the neighbor device according to the stacking configuration comprises:
generating, by the network device, one or more stacking configuration command lines instructions from the stacking configuration;
enabling, by the network device, the stacking configuration by running the one or more stacking configuration command lines instructions locally;
rebooting, by the network device, the network device when the numbering value of the network device in the stacking configuration is inconsistent with an existing numbering value of the network device;
rebooting, by the network device, the network device or informing the neighbor device of reboot when the numbering value of the network device in the stacking configuration is consistent with the existing numbering value of the network device; and stacking, by the network device, the network device and the neighbor device by interacting with the neighbor device based on the enabled stacking configuration.

9. The method according to claim 1, wherein, after determining the device role of the network device and before sending the first neighbor discovery message, the method further comprising:
obtaining, by the network device, a predefined first template file name from a DHCP server;
forming, by the network device, a second template file name by adding the device role of the network device to the first template file name;

downloading, by the network device, a template file from an address of a TFTP server according to the second template file name; and executing, by the network device, one or more command lines in the template file to:

enable a neighbor discovery function, activate a neighbor topology process in order to send the first neighbor discovery message, receive the second neighbor discovery message and determine whether the topological structure between the network device and the neighbor device changes or not after the neighbor discovery function is enabled; and activate a stacking management process in order to determine whether the stacking condition is satisfied or not, determine the stacking configuration and stack the network device and the neighbor device according to the stacking configuration.

10. A network device, comprising a processor, by invoking machine-executable instructions corresponding to a control logic for stacking network devices that are stored on a machine-readable storage medium, the processor is caused to:

determine a device role of the network device;

send a first neighbor discovery message to a neighbor device, wherein the first neighbor discovery message carries at least the device role and a bridge Media Access Control (MAC) address of the network device;

receive a second neighbor discovery message sent by the neighbor device which carries at least a device role and a bridge MAC address of the neighbor device;

determine whether a topological structure between the network device and the neighbor device changes or not according to the second neighbor discovery message;

determine whether a stacking condition to trigger stacking the network device and the neighbor device is satisfied when it is determined that the topological structure changed;

determine a stacking configuration for stacking the network device and the neighbor device when it is determined that the stacking condition is satisfied; and stack the network device and the neighbor device according to the stacking configuration, wherein the stacking condition comprises that:

the device role of the network device is the same as the device role of the neighbor device;

the bridge MAC address of the network device is different from the bridge MAC address of the neighbor device; and the network device is not in a stacking mode presently.

11. The device according to claim 10, wherein, when determining the device role of the network device, the machine-executable instructions further cause the processor to:

obtain an address of a Trivial File Transfer Protocol (TFTP) server from a Dynamic Host Configuration Protocol (DHCP) server;

download a tag file corresponding to the network device from the obtained TFTP server address;

parse the tag file;

determine a device role in the tag file as the device role of the network device when the parsing is successful; and determine a local default device role for the network device as the device role of the network device when the parsing is failed.

12. The device according to claim 10, wherein, when determining the stacking configuration for stacking the network device and the neighbor device, the machine-executable instructions further cause the processor to:

determine a numbering value of the network device according to the bridge MAC address of the network device and the bridge MAC address of the neighbor device;

determine a numbering value of a stacking port on the network device to be used for stacking the network device and the neighbor device, according to the numbering value of the network device and a correspondence between numbering values of network device and stacking port; and determine one or more member ports of the stacking port.

13. The device according to claim 10, wherein, when stacking the network device and the neighbor device according to the stacking configuration, the machine-executable instructions further cause the processor to:

generate one or more stacking configuration command lines instructions from the stacking configuration;

enable and store the stacking configuration by running the one or more stacking configuration command lines instructions locally;

reboot the network device when the numbering value of the network device in the stacking configuration is inconsistent with an existing numbering value of the network device;

reboot the network device or inform the neighbor device of reboot when the numbering value of the network device in the stacking configuration is consistent with the existing numbering value of the network device; and stack the network device and the neighbor device by interacting with the neighbor device based on the enabled stacking configuration.

* * * * *